US008380164B2

(12) United States Patent
Lee et al.

(10) Patent No.: US 8,380,164 B2
(45) Date of Patent: Feb. 19, 2013

(54) FEE CHARGING SYSTEM, FEE CHARGING METHOD, SERVICE SERVER, SERVICE PROVIDING METHOD, AND STORAGE MEDIUM

(75) Inventors: Jeong Hoon Lee, Seoul (KR); Jeong Min You, Seoul (KR); In Hwan Kim, Seoul (KR)

(73) Assignee: SK Telecom Co., Ltd. (KR)

( * ) Notice: Subject to any disclaimer, the term of this patent is extended or adjusted under 35 U.S.C. 154(b) by 0 days.

(21) Appl. No.: 13/133,086

(22) PCT Filed: Oct. 13, 2009

(86) PCT No.: PCT/KR2009/005858

§ 371 (c)(1), (2), (4) Date: Jun. 6, 2011

(87) PCT Pub. No.: WO2010/064787

PCT Pub. Date: Jun. 10, 2010

(65) Prior Publication Data

US 2011/0244827 A1 Oct. 6, 2011

(30) Foreign Application Priority Data

Dec. 5, 2008 (KR) ........................ 10-2008-0123247

(51) Int. Cl.
*H04W 4/24* (2009.01)

(52) U.S. Cl. .......................................... 455/406; 705/26

(58) Field of Classification Search .................. 455/406, 455/417, 445; 705/26, 44

See application file for complete search history.

(56) References Cited

U.S. PATENT DOCUMENTS

2001/0037254 A1* 11/2001 Glikman ........................ 705/26
2002/0187776 A1* 12/2002 Brassil et al. ................. 455/417

FOREIGN PATENT DOCUMENTS

| | | |
|---|---|---|
| JP | 2000-250988 | 9/2000 |
| KR | 1020030028126 | 4/2003 |
| KR | 1020040081819 | 9/2004 |
| KR | 1020040105938 | 12/2004 |

* cited by examiner

*Primary Examiner* — Ajit Patel
*Assistant Examiner* — Myron K Wyche
(74) *Attorney, Agent, or Firm* — Baker & Hostetler LLP

(57) ABSTRACT

The present invention relates to a billing system, method, a service server and end-point terminal respectively which allows the end-point terminal to use billing authentication information of another mobile communication terminal. The billing system comprises: a first mobile communication terminal and at least a second mobile communication terminal with each mobile communication terminal connected in common to a service server through a mobile communication network in which said end-point terminal is connected to said first mobile communication terminal through a first short-range communication network for providing contents to the first end-point terminal that uses the billing authentication information of the second mobile communication terminal and a billing server for performing a billing process if the service server transmits contents to the first end-point terminal upon validation by the service server by comparing the billing authentication information transmitted from the first end-point terminal with billing authentication information received from the second mobile communication terminal to determine if a match exists.

6 Claims, 4 Drawing Sheets

FEE CHARGING SYSTEM, FEE CHARGING METHOD, SERVICE SERVER, SERVICE PROVIDING METHOD, AND STORAGE MEDIUM

TECHNICAL FIELD

The present invention relates to a billing system, a billing method, a service server, a service providing method, and a storage medium, for performing a billing process for an end-point terminal that uses authentication information of another mobile communication terminal, and more specifically to a technique for performing a billing process, in which although billing authentication information provided by the end-point terminal to the service server is not billing authentication information of a first mobile communication terminal, but billing authentication information of a second mobile communication terminal, the end-point terminal can use a service, and a fee for using the service is charged on the second mobile communication terminal that has provided the billing authentication information, not on the first mobile communication terminal.

BACKGROUND ART

With the advancement of information communication technologies, a variety of end-point terminals capable of playing back documents, images and moving pictures (hereinafter, 'documents, images and moving pictures' will be simply referred to as 'contents' for the convenience of explanation, unless otherwise specified), such as MPeg audio layer-3 (MP3) players, Personal Multimedia Players (PMP) and Ultra Mobile Personal Computers (UMPC), are widely used. A user downloads desired contents from personal computers (PC) and plays back the downloaded contents. However, there is a problem in that the user cannot download desired contents when the user is moving or cannot connect to a PC.

In order to solve the problem, proposed are techniques for adding a communication means connectible to a short-range communication network onto an end-point terminal, such as a Bluetooth or an ultra-wideband (UWB), and connecting the end-point terminal to a mobile communication terminal through the short-range communication network. According to the techniques, a user can be provided with a desired service through an end-point terminal and a mobile communication terminal of the user. That is, the user manipulates the end-point terminal and the mobile communication terminal to communicate with each other in a short-range wireless communication method through the short-range communication network to exchange needed data with each other. The mobile communication terminal is connected to a variety of servers through a mobile communication network (or a wired communication network such as the Internet or the like via the mobile communication network) and relays needed data between the end-point terminal and the servers, and thus the end-point terminal eventually can use a needed data service through the short-range communication network and the mobile communication network owing to the relay of the mobile communication network.

On the other hand, although the end-point terminal used by the user receives contents from a service server via the first mobile communication terminal, a service fee of the end-point terminal needs to be charged on the second mobile communication terminal. For example, if the user is a teenager carrying the first mobile communication terminal and parents of the user have the second mobile communication terminal, the parents may desire a service fee for using contents by the teenage user to be charged on the second mobile communication terminal of the parents, not on the first mobile communication terminal of the child.

Conventionally, techniques for a mobile communication terminal to collect billing information of an end-point terminal for using contents and transmit the billing information to a billing server have been proposed. However, although the conventional techniques are used, the requirements described above cannot be satisfied, and in addition, loads on the mobile communication terminal collecting and transmitting the billing information to the server are intensified furthermore.

DISCLOSURE OF INVENTION

Technical Problem

Therefore, the present invention has been made in view of the above problems, and it is an object of the present invention to provide a technique for performing a billing process, in which although an end-point terminal user is provided with contents through a first mobile communication terminal, a fee for using the contents providing service is charged on a second mobile communication terminal.

Technical Solution

To accomplish the above object, according to an embodiment of the present invention, there is provided a billing system for performing a billing process for an end-point terminal that uses billing authentication information of another mobile communication terminal, the system comprising: a first end-point terminal connected to a first mobile communication terminal through a first short-range communication network and connected to a service server via the first mobile communication terminal, for using contents by using billing authentication information of a second mobile communication terminal; the first mobile communication terminal connected to the first end-point terminal through the first short-range communication network, connected to the service server through a mobile communication network, and connecting the first end-point terminal that uses the billing authentication information of the second mobile communication terminal to the service server; the second mobile communication terminal connected to the service server through the mobile communication network, for providing the first end-point terminal with its own billing authentication information; the service server connected to the first and second mobile communication terminals through the mobile communication network, for providing the contents to the first end-point terminal that uses the billing authentication information of the second mobile communication terminal; and a billing server for performing a billing process on the second mobile communication terminal if the service server transmits the contents to the first end-point terminal.

In the embodiment, the service server may provide the contents if the billing authentication information of the second mobile communication terminal provided by the first end-point terminal matches billing authentication information received from the second mobile communication terminal.

According to another embodiment of the present invention, there is provided a billing method for performing a billing process for an end-point terminal that uses billing authentication information of another mobile communication terminal, performed by a system in which a first end-point terminal is connected to a first mobile communication terminal through a first short-range communication network, the first mobile communication terminal and a second mobile communication terminal are connected to a service server through a mobile communication network, and the service server is connected to a billing server through a wired communication network, the method comprising the steps of: a) connecting to the service server via the first mobile communication terminal and requesting the service server to provide contents, by the first end-point terminal; b) providing the service server with information on a billing target, by the first end-point terminal; c) transmitting billing authentication information of the second mobile communication terminal, which is the billing target, to the service server, by the first end-point terminal; d) providing the first end-point terminal with the requested contents, by the service server; and e) transmitting billing information on the second mobile communication terminal to the billing server, by the service server, and performing a billing process on the second mobile communication terminal, by the billing server.

In the embodiment, the billing method may further comprise the step of: c-1) confirming, after performing step c), validity of the billing authentication information transmitted from the first end-point terminal by comparing the billing authentication information transmitted from the first end-point terminal with billing authentication information received from the second mobile communication terminal, by the service server.

According to still another embodiment of the present invention, there is provided a service server for providing a service to an end-point terminal that uses billing authentication information of another mobile communication terminal, the server comprising: a communication unit for transmitting and receiving data through a mobile communication network; a mobile communication terminal management unit for managing information on first and second mobile communication terminals received through the communication unit; an end-point terminal management unit for managing information on first and second end-point terminals received through the communication unit; a short-range communication network management unit for managing information on a first short-range communication network that relays communications between the first mobile communication terminal and the first end-point terminal, and information on a second short-range communication network that relays communications between the second mobile communication terminal and the second end-point terminal; a storage unit for storing the information on the first and second mobile communication terminals, on the first and second end-point terminals, and on the first and second short-range communication networks, and a billing history; and a control unit for controlling operation of each constitutional component, providing contents in response to a request from the first end-point terminal that uses billing authentication information of the second mobile communication terminal, and controlling the communication unit to provide a billing server with the billing authentication information of the second mobile communication terminal.

In the embodiment, the control unit may compare billing authentication information included in the second mobile communication terminal information stored in the storage unit with billing authentication information transmitted from the first end-point terminal and received through the communication unit, and determine to provide the contents if the two pieces of billing authentication information match.

According to still another embodiment of the present invention, there is provided a method for providing a service to an end-point terminal that uses billing authentication information of another mobile communication terminal by a service server, the method comprising the steps of: a) receiving a connection request and a contents provide request from a first end-point terminal having billing authentication information of a second mobile communication terminal; b) providing contents requested by the first end-point terminal; and c) providing a billing server with the billing authentication information of the second mobile communication terminal.

In the embodiment, the service providing method may further comprise the step of: a-1) confirming validity of the billing authentication information by comparing the billing authentication information received from the first end-point terminal with billing authentication information received from the second mobile communication terminal.

According to still another embodiment of the present invention, there is provided a storage medium for storing the method for providing a service to an end-point terminal that uses billing authentication information of another mobile communication terminal by a service server as a program.

Advantageous Effects

The present invention is effective in that although the service server provides contents to the first end-point terminal that has billing authentication information of the second mobile communication terminal via the first mobile communication terminal, a fee for using the service is charged on the second mobile communication terminal, not on the first mobile communication terminal.

BEST MODE FOR CARRYING OUT THE INVENTION

Figure 1:
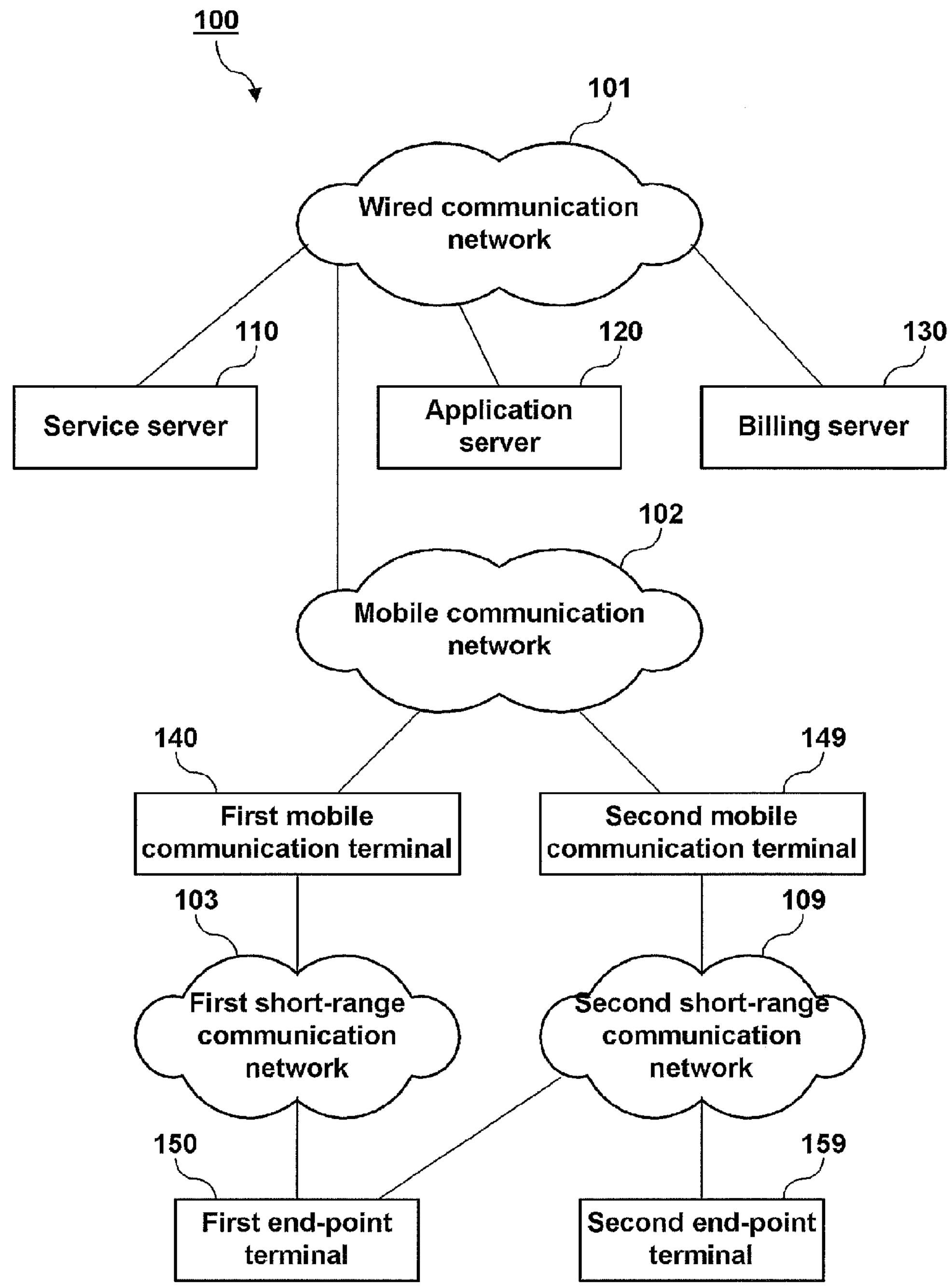
FIG. 1 is a block diagram showing a billing system according to an embodiment of the present invention.

The preferred embodiments of the present invention will be hereafter described in detail, with reference to the accompanying drawings.

The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

First, a billing system for performing a billing process for an end-point terminal that uses billing authentication information of another mobile communication terminal according to an embodiment of the invention will be described with reference to FIG. 1.

FIG. 1 is a block diagram showing a billing system according to an embodiment of the present invention.

As shown in FIG. 1, a billing system 100 for performing a billing process for an end-point terminal that uses billing authentication information of another mobile communication terminal according to the embodiment (hereinafter, ‘a billing system for performing a billing process for an end-point terminal that uses billing authentication information of another mobile communication terminal’ will be simply referred to as ‘a billing system’ for the convenience of explanation, unless otherwise specified) is configured to connect a service server 110, an application server 120, and a billing server 130 through a wired communication network 101 and/or a mobile communication network 102, to connect the service server 110 to first and second mobile communication terminals 140 and 149 (←142) through the mobile communication network 102, to connect the first mobile communication terminal 140 to a first end-point terminal 150 through a first short-range communication network 103, and to connect the second mobile communication terminal 149 to a second end-point terminal 159 through a second short-range communication network 109. The short-range communication networks used in this system can be a wireless LAN, a Bluetooth, a UWB, or the like. In addition, although the application server 120 and/or the billing server 130 can be configured as an independent server as described, they can be included in the service server 110 as a constitutional component.

The first end-point terminal 150 is connected to the service server 110 through the first short-range communication network and the first mobile communication terminal 140. The first end-point terminal 150 uses contents received from the service server 110 using billing authentication information of the second mobile communication terminal 149. The first end-point terminal 150 may download the billing authentication information by communicating with the second mobile communication terminal 149 or copy the billing authentication information using an external memory or the like. The first end-point terminal 150 may include a communication unit for transmitting and receiving data through the first short-range communication network, an input unit for receiving a user command, a playback unit for executing the contents, a storage unit for storing the contents, the billing authentication information of the second mobile communication terminal, and the like, and a control unit for controlling operation of each constitutional component.

The first mobile communication terminal 140 connects the first end-point terminal 150 that uses the billing authentication information of the second mobile communication terminal 149 to the service server 110. The first mobile communication terminal 140 may include a first communication unit for transmitting and receiving data through the mobile communication network 102, a second communication unit for transmitting and receiving data through the short-range communication network 103, an end-point terminal management unit for managing information on the end-point terminal, and a control unit for controlling operation of each constitutional component.

The second mobile communication terminal 149 provides the first end-point terminal 150 with its own billing authentication information.

The service server 110 provides the first end-point terminal 150 that uses the billing authentication information of the second mobile communication terminal 149 with contents. The service server 110 preferably provides the contents if the billing authentication information of the second mobile communication terminal provided by the first end-point terminal 150 matches billing authentication information received from the second mobile communication terminal 149.

The billing server 130 performs a billing process on the second mobile communication terminal 149 if the service server 110 transmits the contents to the first end-point terminal 150.

The application server 120 stores and provides the contents outside.

Hereinafter, a billing method for performing a billing process for an end-point terminal that uses billing authentication information of another mobile communication terminal according to an embodiment of the present invention will be described with reference to FIG. 2.

Figure 2:
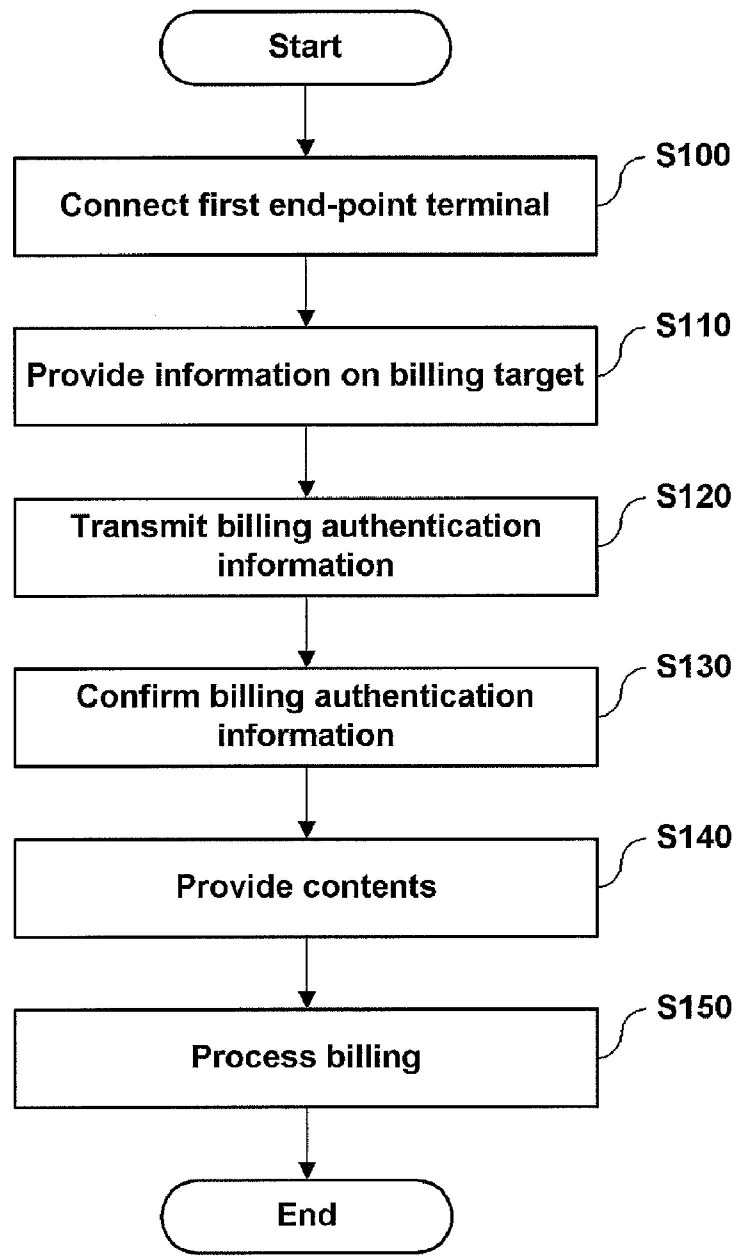
FIG. 2 is a flowchart illustrating a billing method according to an embodiment of the present invention.

FIG. 2 is a flowchart illustrating a billing method according to an embodiment of the present invention.

As shown in FIG. 2, a billing method for performing a billing process for an end-point terminal that uses billing authentication information of another mobile communication terminal according to the embodiment (hereinafter, ‘a billing method for performing a billing process for an end-point terminal that uses billing authentication information of another mobile communication terminal’ will be simply referred to as ‘a billing method’ for the convenience of explanation, unless otherwise specified) can be applied to a system in which a first end-point terminal is connected to a first mobile communication terminal through a first short-range communication network, the first mobile communication terminal and a second mobile communication terminal are connected to a service server through a mobile communication network, and the service server is connected to a billing server through a wired communication network.

As a first step, the first end-point terminal is connected to the service server via the first mobile communication terminal and requests the service server to provide contents S100. At this point, the service server receives information on the first end-point terminal, information on the first mobile communication terminal, and information on the first short-range communication network and performs a certain connection authentication.

As a second step, the first end-point terminal provides the service server with information on a billing target S110. The billing target is the second mobile communication terminal since the first end-point terminal has billing authentication information of the second mobile communication terminal. On the other hand, if the first end-point terminal has a plurality of billing authentication information, the first end-point terminal provides any one of the billing authentication information. The billing authentication information may be a unique identification number or USIM information of a mobile communication terminal.

As a third step, the first end-point terminal transmits the billing authentication information of the second mobile communication terminal, which is the billing target, to the service server S120. Here, in a method for transmitting the billing authentication information of the second mobile communication terminal by the first end-point terminal, the first end-point terminal connects to the second mobile communication terminal through the second short-range communication network, directly receives the billing authentication information from the second mobile communication terminal, and stores and transmits the billing authentication information. This is possible when the second mobile communication terminal stores its billing authentication information without encryption.

In another method, if the billing authentication information of the second mobile communication terminal is encrypted, the second mobile communication terminal receives unencrypted billing authentication information of the second mobile communication terminal from the service server and provides the first end-point terminal with the unencrypted billing authentication information, and the first end-point terminal receives and transmits the unencrypted billing authentication information.

In still another method, if the billing authentication information of the second mobile communication terminal cannot be transmitted due to a reason of security or the like, the billing authentication information of the second mobile communication terminal is stored in the service server, and the second mobile communication terminal transmits a permission code for using the billing authentication information to the first end-point terminal. Then, the first end-point terminal transmits the permission code to the service server, and the service server authenticates billing.

As a fourth step, the service server confirms validity of the billing authentication information transmitted from the first end-point terminal by comparing the billing authentication information transmitted from the first end-point terminal with billing authentication information received from the second mobile communication terminal S130.

As a fifth step, the service server provides the first end-point terminal with the requested contents S140. The provided contents can be contents possessed by the service server or contents stored in the application server.

As a sixth step, the service server transmits billing information on the second mobile communication terminal to the billing server, and the billing server performs a billing process on the second mobile communication terminal S150.

Hereinafter, a service server for providing a service to an end-point terminal that uses billing authentication information of another mobile communication terminal according to an embodiment of the present invention will be described with reference to FIG. 3.

Figure 3:
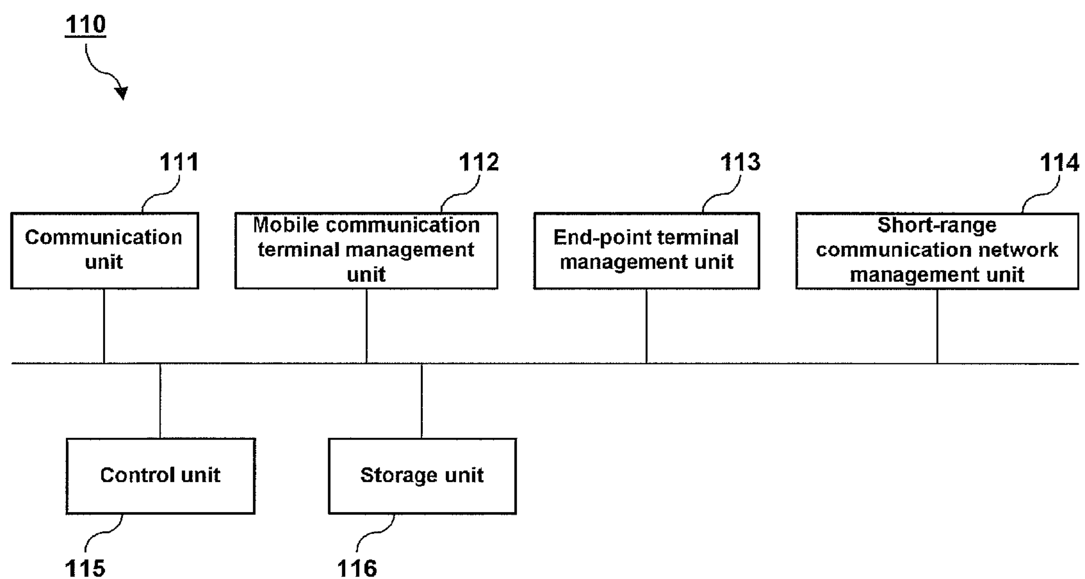
FIG. 3 is a detailed block diagram showing a service server according to an embodiment of the present invention.

FIG. 3 is a detailed block diagram showing a service server 110 according to an embodiment of the present invention (hereinafter, 'a service server for providing a service to an end-point terminal that uses billing authentication information of another mobile communication terminal' will be simply referred to as 'a service server' for the convenience of explanation, unless otherwise specified).

Hereinafter, functions of constitutional components of the service server for providing a service to an end-point terminal that uses billing authentication information of another mobile communication terminal according to the embodiment will be described.

A communication unit 111 transmits and receives data through a mobile communication network.

A mobile communication terminal management unit 112 manages information on first and second mobile communication terminals received through the communication unit 111. It is notable that the information on the mobile communication terminals includes billing authentication information.

An end-point terminal management unit 113 manages information on first and second end-point terminals received through the communication unit 111.

A short-range communication network management unit 114 manages information on a first short-range communication network that relays communications between the first mobile communication terminal and the first end-point terminal, and information on a second short-range communication network that relays communications between the second mobile communication terminal and the second end-point terminal.

A storage unit 116 stores the information on the first and second mobile communication terminals, on the first and second end-point terminals, and on the first and second short-range communication networks, and a billing history.

A control unit 115 controls operation of each constitutional component, provides contents in response to a request from the first end-point terminal that uses billing authentication information of the second mobile communication terminal, and controls the communication unit 111 to provide the billing server with the billing authentication information of the second mobile communication terminal. In addition, the control unit 115 preferably compares billing authentication information included in the second mobile communication terminal information stored in the storage unit 116 with the billing authentication information transmitted from the first end-point terminal and received through the communication unit 111, and determines to provide the contents if the two pieces of billing authentication information match.

Hereinafter, a method for providing a service to an end-point terminal that uses billing authentication information of another mobile communication terminal by a service server according to an embodiment of the present invention will be described with reference to FIG. 4.

Figure 4:
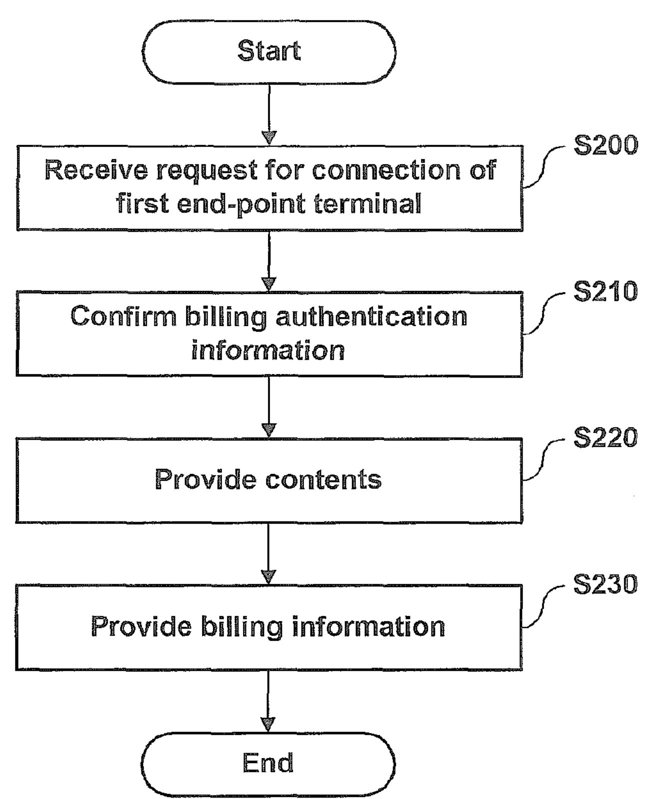
FIG. 4 is a flowchart illustrating a service providing method according to an embodiment of the present invention.

FIG. 4 is a flowchart illustrating a service providing method according to an embodiment of the present invention.

As shown in FIG. 4, in a method for providing a service to an end-point terminal that uses billing authentication information of another mobile communication terminal by a service server according to the embodiment (hereinafter, 'a method for providing a service to an end-point terminal that uses billing authentication information of another mobile communication terminal by a service server' will be simply referred to as 'a service providing method' for the convenience of explanation, unless otherwise specified), the service server receives a connection request and a contents provide request from a first end-point terminal having billing authentication information of a second mobile communication terminal S200, as a first step.

As a second step, the service server confirms validity of the billing authentication information by comparing the billing authentication information received from the first end-point terminal with billing authentication information received from the second mobile communication terminal S210.

As a third step, the service server provides the contents requested by the first end-point terminal S220.

As a fourth step, the service server provides the billing server with the billing authentication information of the second mobile communication terminal S230. Accordingly, the billing server may confirm a billing target.

On the other hand, the method for providing a service to an end-point terminal that uses billing authentication information of another mobile communication terminal by a service server is stored in a storage medium as a program.

Embodiments of the present invention have been described above with reference to the accompanying drawings.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

Industrial Applicability

According to the present invention, although the service server provides contents to the first end-point terminal that has billing authentication information of the second mobile communication terminal via the first mobile communication terminal, a fee for using the service is charged on the second mobile communication terminal, not on the first mobile communication terminal. The present invention described above can be usefully applied to a case in which although desired contents are downloaded through the first mobile communication terminal of a child, a fee for downloading the contents is charged on the second mobile communication terminal of the parents.

The invention claimed is:

1. A billing system for performing a billing process for an end-point terminal that uses billing authentication information of another mobile communication terminal, the system comprising:

a mobile communication network for providing communication between a service server in said billing system and a first end-point terminal through a first mobile communication terminal with said first mobile communication terminal being connected to said first end-point terminal via a first short-range communication network;

a second mobile communication terminal connected to the service server through the mobile communication network, for providing the first end-point terminal with its own billing authentication information;

the service server connected to both the first and second mobile communication terminals through the mobile communication network, with said service server including a control unit for comparing the billing information received from the first end-point terminal with the billing information received from the second mobile communication terminal and for transmitting to the first end-point terminal billing information contents when a match exists between the billing authentication information from the first end-point terminal and the billing authentication information from the second mobile communication terminal; and a billing server for performing a billing process on the second mobile communication terminal if the service server transmits the contents to the first end-point terminal.

2. A billing method for performing a billing process for an end-point terminal that uses billing authentication information of another mobile communication terminal, performed by a system in which a first end-point terminal is connected to a first mobile communication terminal through a first short-range communication network, and including a first mobile communication terminal and a second mobile communication terminal connected in common to a service server through a mobile communication network, and with the service server being connected to a billing server through a wired communication network, the method comprising the steps of:

a) requesting the service server to provide contents to the first end-point terminal regarding a purchase to be billed using billing authentication information of a second mobile communication terminal;

b) providing the service server with information on a billing target, by the first end-point terminal;

c) transmitting billing authentication information of the second mobile communication terminal, which is the billing target, to the service server, by the first end-point terminal;

d) providing the first end-point terminal with the requested contents from the service server upon the service server validating the billing authentication information by comparing the billing authentication information transmitted from the first end-point terminal with billing authentication information received from the second mobile communication terminal; and e) transmitting billing information on the second mobile communication terminal to the billing server, by the service server when the billing authentication information is validated by a match in the comparison performed in step (d), and performing a billing process on the second mobile communication terminal, by the billing server.

3. A service server for providing a service to an end-point terminal that uses billing authentication information of another mobile communication terminal, the server comprising:

a communication unit for transmitting and receiving data through a mobile communication network;

a mobile communication terminal management unit for managing information on first and second mobile communication terminals received through the communication unit;

an end-point terminal management unit for managing information on first and second end-point terminals received through the communication unit;

a short-range communication network management unit for managing information on a first short-range communication network that relays communications between the first mobile communication terminal and the first end-point terminal, and information on a second short-range communication network that relays communications between the second mobile communication terminal and the second end-point terminal;

a storage unit for storing the information on the first and second mobile communication terminals, on the first and second end-point terminals, and on the first and second short-range communication networks, and a billing history; and a control unit for controlling operation of each constitutional component, providing contents in response to a request from the first end-point terminal that uses billing authentication information of the second mobile communication terminal, and controlling the communication unit to provide a billing server with the billing authentication information of the second mobile communication terminal wherein said control unit compares billing authentication information included in the second mobile communication terminal information stored in the storage unit with billing authentication information transmitted from the first end-point terminal and received through the communication unit to determine if the two pieces of billing authentication information match for validating the billing authentication information to be used by the end point terminal.

4. A method for providing a service to an end-point terminal that uses billing authentication information of another mobile communication terminal by a service server which communicates with a first end-point terminal and at least one other mobile communication terminal representing a second mobile communication terminal for receiving billing authentication information from the first end-point terminal and from the second mobile communication terminal, the method comprising the steps of:

a) receiving a connection request and a contents provide request from a first end-point terminal having billing authentication information of said second mobile communication terminal;

b) using said service server to compare billing authentication information of said second mobile communication terminal requested by the first end-point terminal with billing authentication information received from said first end-point terminal;

c) providing contents requested by the first end-point terminal when such comparison of billing authentication information matches; and d) using a billing server to process the contents received by the first end-point terminal with the billing authentication information of the second mobile communication terminal following step (c).

5. A storage medium according to claim 4, for storing the method for providing a service to an end-point terminal that uses billing authentication information of another mobile communication terminal by a service server as a program.

6. An end point terminal for performing a billing process which uses billing authentication information of another mobile communication terminal in a billing system comprising a first mobile communication terminal and at least one other mobile communication terminal representing a second mobile communication terminal with each mobile communication terminal connected in common to a service server through a mobile communication network in which said end-point terminal is connected to said first mobile communication terminal through a first short-range communication network and wherein said end-point terminal performs said billing process by requesting the service server to provide contents and information on a billing target; transmitting billing authentication information of the second mobile communication terminal representing the billing target to the end-point terminal; and wherein said end-point terminal receives the requested contents transmitted from the service server upon the service server validating the billing authentication information by comparing billing authentication information received from the second mobile communication terminal when such comparison of billing authentication information matches.

* * * * *